(12) United States Patent
Druml et al.

(10) Patent No.: US 10,177,846 B2
(45) Date of Patent: Jan. 8, 2019

(54) TRANSCEIVER DEVICE, ACCESS CONTROL DEVICES, A TRANSMITTER DEVICE AND A RECEIVER DEVICE

(71) Applicant: Infineon Technologies AG, Neubiberg (DE)

(72) Inventors: Norbert Druml, Graz (AT); Armin Krieg, Graz (AT); Markus Dielacher, Graz (AT); Robert Lobnik, Graz (AT); Michael Mark, Graz (AT)

(73) Assignee: Infineon Technologies AG, Neubiberg (DE)

( * ) Notice: Subject to any disclaimer, the term of this patent is extended or adjusted under 35 U.S.C. 154(b) by 115 days.

(21) Appl. No.: 14/556,540

(22) Filed: Dec. 1, 2014

(65) Prior Publication Data

US 2016/0156419 A1 Jun. 2, 2016

(51) Int. Cl.
*H04B 10/114* (2013.01)
*H04W 4/80* (2018.01)
(Continued)

(52) U.S. Cl.
CPC ..... *H04B 10/1143* (2013.01); *H04B 10/1149* (2013.01); *H04W 4/023* (2013.01);
(Continued)

(58) Field of Classification Search
CPC ..... H04B 10/11–10/116; H04W 4/008; H04W 4/023; H04W 48/04; H04W 72/0453;
(Continued)

(56) References Cited

U.S. PATENT DOCUMENTS 6,323,980 B1 11/2001 Bloom
9,021,139 B1 * 4/2015 Kim ............... H04W 12/06
709/250
(Continued)

FOREIGN PATENT DOCUMENTS

EP 1427117 A1 6/2004

OTHER PUBLICATIONS

Xbox Support. "Connect a Wireless Xbox One Controller to Your Console." Retrieved Dec. 1, 2014 https://support.xbox.com/en-US/xbox-one/accessories/connect-a-wireless-controller.
(Continued)

*Primary Examiner* — Casey Kretzer
(74) *Attorney, Agent, or Firm* — Eschweiler & Potashnik, LLC

(57) ABSTRACT

A transceiver device includes a time of flight circuit configured to emit a modulated light transmit signal and to receive a modulated light receive signal. The transceiver device includes a control module configured to control a transmission of a modulated light transmit signal by the time of flight circuit to an access control device. The modulated light transmit signal includes information related to a transmission access request. The control module is further configured to control an establishment of a wireless transmission channel based on a modulated light receive signal received by the time of flight circuit from the access control device. The modulated light receive signal includes information for establishing the wireless transmission channel.

17 Claims, 6 Drawing Sheets

(51) Int. Cl.
  *H04W 12/06* (2009.01)
  *H04W 4/02* (2018.01)
  *H04W 12/08* (2009.01)
  *H04W 48/04* (2009.01)
(52) U.S. Cl.
  CPC .............. *H04W 4/80* (2018.02); *H04W 12/06* (2013.01); *H04W 12/08* (2013.01); *H04W 48/04* (2013.01)
(58) Field of Classification Search
  CPC ....... H04W 76/02; H04W 12/06–12/08; G08C 23/00–23/06
  See application file for complete search history.

(56) References Cited

U.S. PATENT DOCUMENTS

| | | | | |
|---|---|---|---|---|
| 2005/0276418 | A1* | 12/2005 | Hagiwara | H04L 9/32 380/270 |
| 2006/0143292 | A1* | 6/2006 | Taubenheim | H04L 63/10 709/225 |
| 2006/0153075 | A1* | 7/2006 | Whitehill | H04L 63/0492 370/230 |
| 2008/0318588 | A1 | 12/2008 | Parkvall et al. | |
| 2009/0067846 | A1* | 3/2009 | Yu | H04B 10/1143 398/128 |
| 2009/0072996 | A1* | 3/2009 | Schoepp | B60Q 1/1423 340/903 |
| 2009/0142053 | A1* | 6/2009 | Varshneya | G01S 7/481 398/33 |
| 2010/0271614 | A1* | 10/2010 | Albuquerque | G01S 7/4811 356/4.01 |
| 2013/0286376 | A1 | 10/2013 | Rousseau | |
| 2015/0044970 | A1* | 2/2015 | Park | H04M 1/7253 455/41.2 |
| 2015/0195042 | A1* | 7/2015 | Raskar | H04B 10/502 398/118 |
| 2015/0296546 | A1* | 10/2015 | Hamilton | H04L 67/34 455/41.1 |
| 2015/0365801 | A1* | 12/2015 | Smith | H04W 64/00 455/404.2 |
| 2016/0088546 | A1 | 3/2016 | Birch et al. | |
| 2016/0157099 | A1 | 6/2016 | Schatzberg | |
| 2016/0345414 | A1 | 11/2016 | Nolan | |

OTHER PUBLICATIONS

Non Final Office Action dated Nov. 18, 2016 U.S. Appl. No. 14/809,468.

Non-Final Office Action dated Dec. 18, 2017 in connection with U.S. Appl. No. 14/809,468.

Final Office Action dated Jun. 9, 2017 in connection with U.S. Appl. No. 14/809,468.

Notice of Allowance dated Jul. 16, 2018 in connection with U.S. Appl. No. 14/809,468.

* cited by examiner

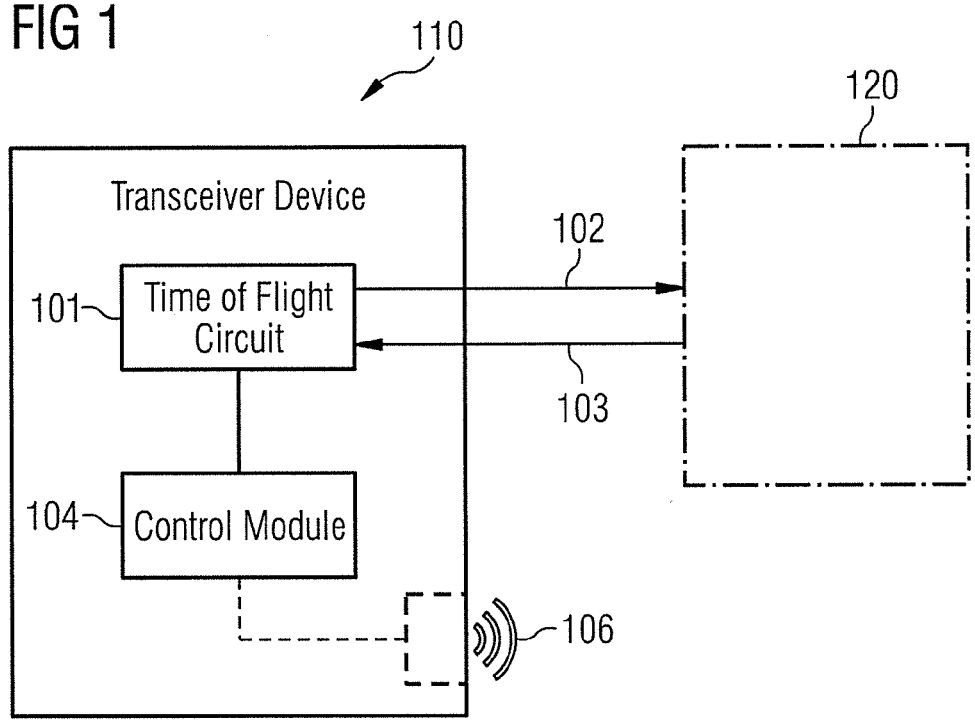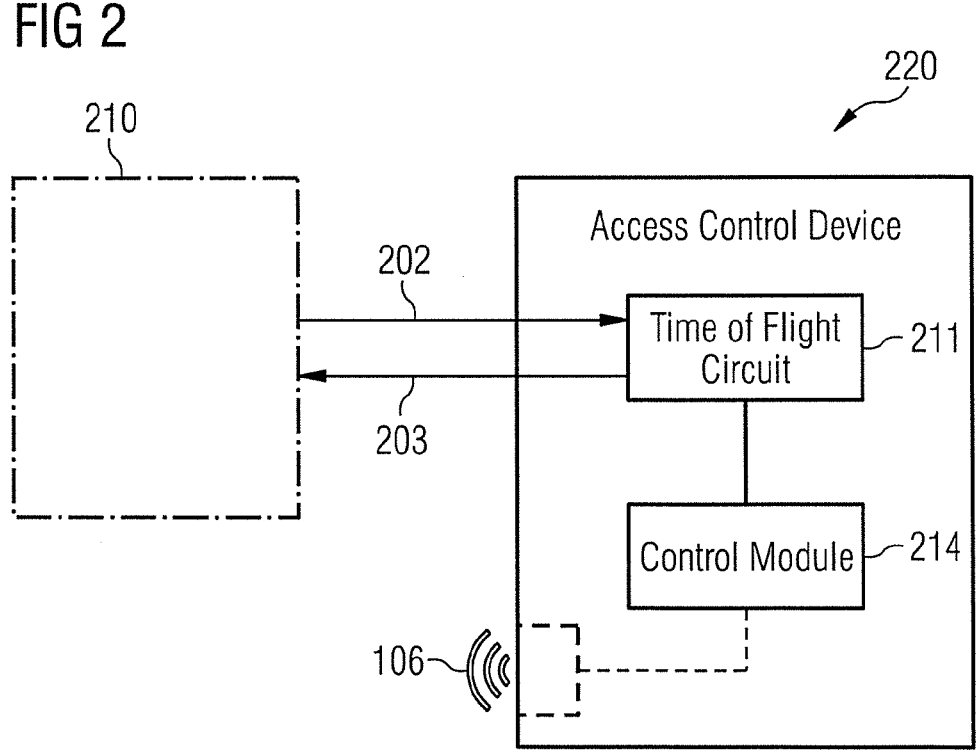

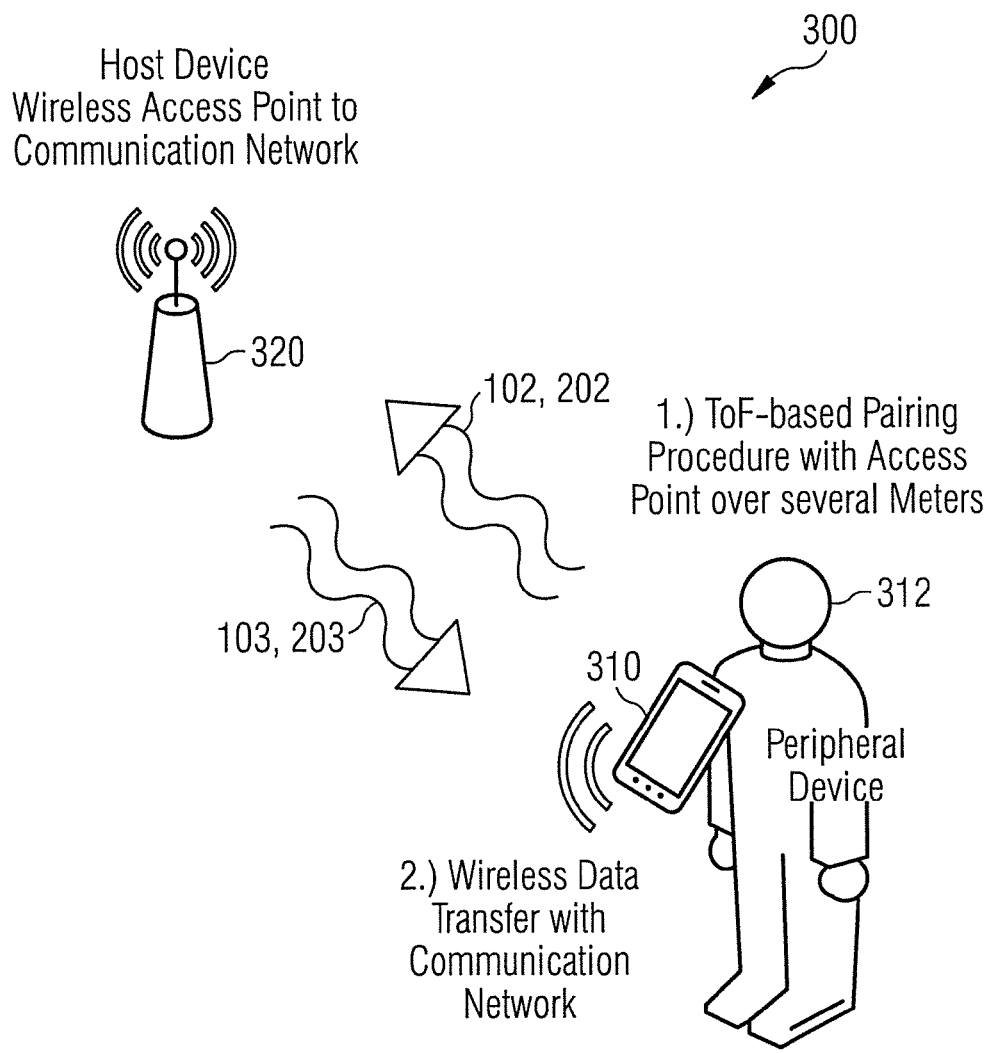

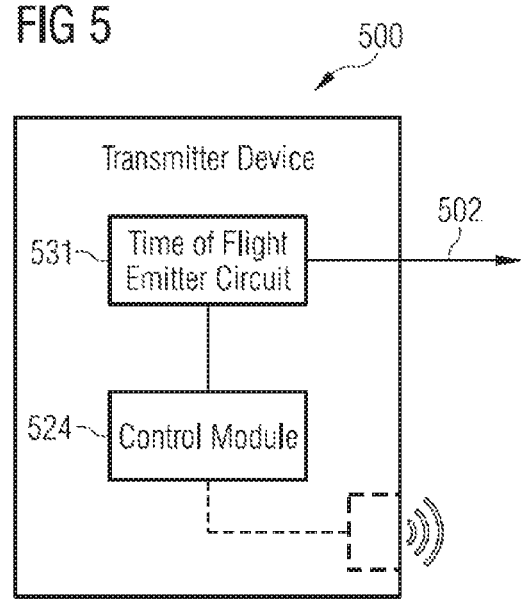
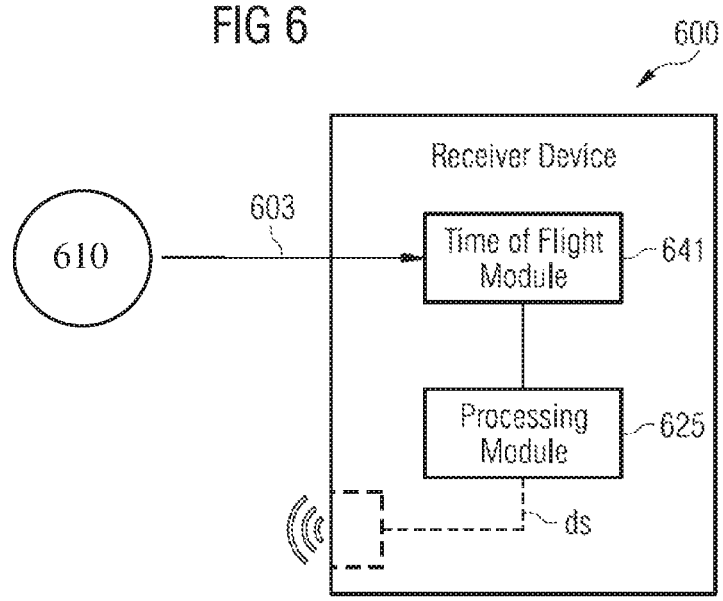

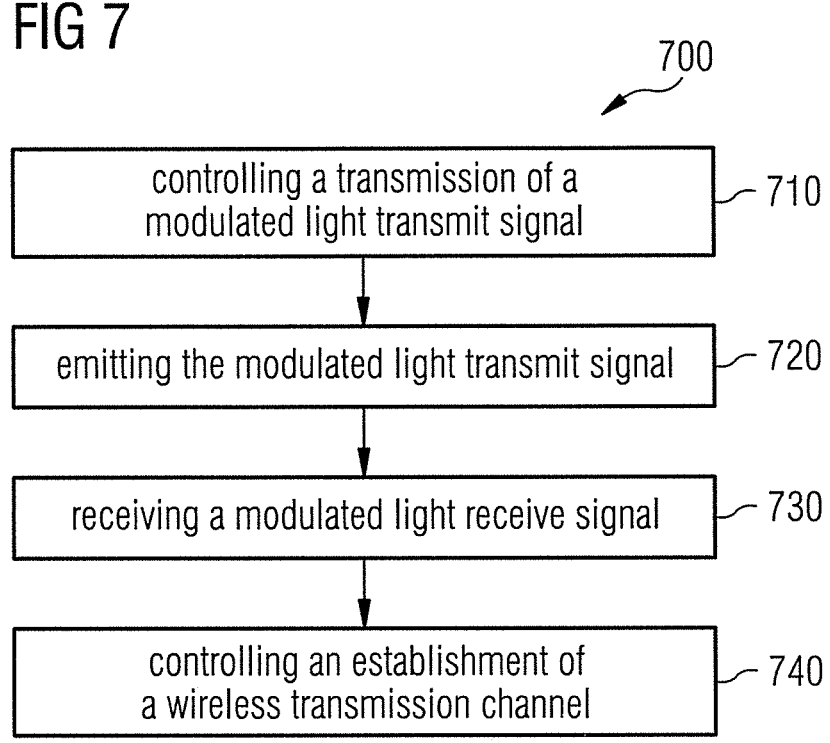
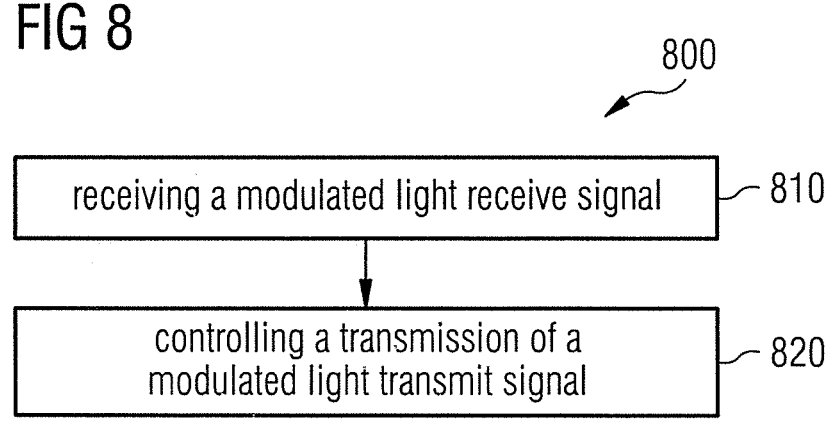

TRANSCEIVER DEVICE, ACCESS CONTROL DEVICES, A TRANSMITTER DEVICE AND A RECEIVER DEVICE

FIELD

Embodiments relate to pairing and authenticating wireless devices and in particular to a transceiver device, access control devices, a transmitter device and a receiver device.

BACKGROUND

Wired and wireless communication networks may implement pairing and authentication procedures. A pairing procedure may be carried out between a host device and a peripheral device in order to integrate the peripheral device into the network, for example. The pairing procedures may be cumbersome due to the required knowledge of network identification numbers, login information and passwords, for example. Furthermore, pairing and authentication procedures may be subject to middleman security attacks, for example.

SUMMARY

Some embodiments relate to a transceiver device. The transceiver device includes a time of flight circuit configured to emit a modulated light transmit signal and to receive a modulated light receive signal. The transceiver device includes a control module configured to control a transmission of a modulated light transmit signal by the time of flight circuit to an access control device. The modulated light transmit signal includes information related to a transmission access request. The control module is further configured to control an establishment of a wireless transmission channel based on a modulated light receive signal received by the time of flight circuit from the access control device. The modulated light receive signal includes information for establishing the wireless transmission channel.

Some embodiments relate to an access control device. The access control device includes a time of flight circuit configured to receive a modulated light receive signal from a peripheral device. The modulated light receive signal includes information related to a transmission access request. The access control device includes a control module configured to control a transmission of a modulated light transmit signal by the time of flight circuit. The modulated light transmit signal includes information for establishing a transmission channel between the access control device and the peripheral device.

Some embodiments relate to an access control device. The access control device includes a time of flight circuit configured to determine distance information of a distance between the access control device and a peripheral device, or to receive a modulated light receive signal including distance information related to a distance between the access control device and the peripheral device. The access control device further includes a control module configured to allow establishing a transmission channel between the access control device and the peripheral device based on the distance information.

Some embodiments relate to a transmitter device. The transmitter device includes a control module configured to control a transmission of a modulated light transmit signal by a time of flight emitter circuit. The modulated light transmit signal includes load data to be transmitted.

Some embodiments relate to a receiver device. The receiver device includes a time of flight module configured to receive a modulated light receive signal including load data. The receiver device further includes a processing module configured to generate a data signal including the load data based on the modulated light receive signal.

BRIEF DESCRIPTION OF THE DRAWINGS

Some embodiments of apparatuses and/or methods will be described in the following by way of example only, and with reference to the accompanying figures, in which FIG. 1 shows a schematic illustration of a transceiver device;

FIG. 2 shows a schematic illustration of an access control device;

FIGS. 3A to 3C show schematic illustrations of a time of flight-based pairing and authentication process between an access control device and a peripheral device;

FIG. 5 shows a schematic illustration of a transmitter device;

FIG. 6 shows a schematic illustration of a receiver device;

FIG. 7 shows a flow chart of a method for establishing a wireless transmission channel by a transceiver device; and FIG. 8 shows a flow chart of a method for establishing a wireless transmission channel by a receiver device.

DETAILED DESCRIPTION

Figure 3B:
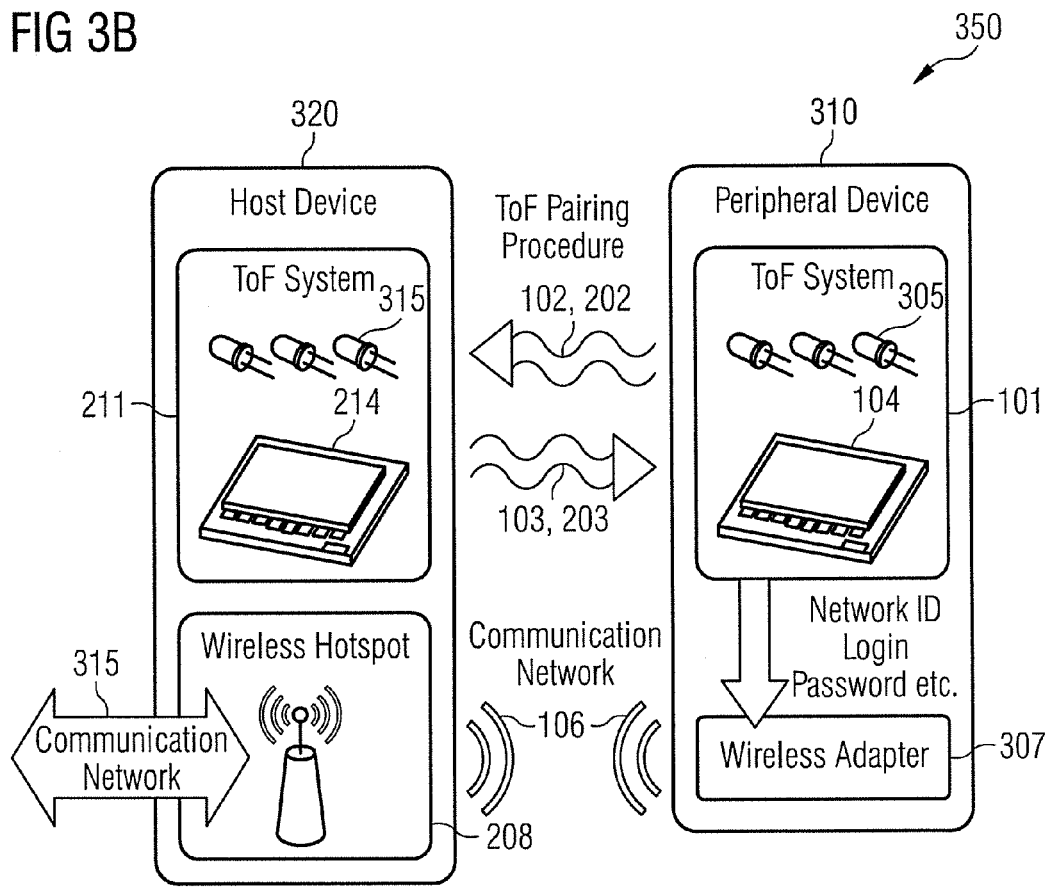

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 shows a schematic illustration of a transceiver device 110 according to an embodiment.

The transceiver device 110 includes a time of flight circuit 101 configured to emit a modulated light transmit signal 102 and to receive a modulated light receive signal 103.

The transceiver device 110 includes a control module 104 configured to control a transmission of a modulated light transmit signal 102 by the time of flight circuit 101 to an access control device 120. The modulated light transmit signal 102 includes information related to a transmission access request.

The control module 104 is further configured to control an establishment of a wireless transmission channel 106 based on a modulated light receive signal 103 received by the time of flight circuit 101 from the access control device 120. The modulated light receive signal 103 includes information for establishing the wireless transmission channel.

Due to the time of flight (TOF) modulated light transmit signal being used for a transmission access request and the TOF modulated light receive signal being used for establishing a wireless transmission channel, pairing and authentication between the transceiver device and an access control device may be improved. For example, pairing can be carried out over longer distances (in comparison to short range pairing methods such as near field communication NFC pairing). Furthermore, errors associated with the manual pairing of devices may be reduced or avoided, for example.

The time of flight (TOF) circuit 101 may include one or more TOF circuit components for emitting the modulated light transmit signal 102 and for receiving the modulated light receive signal 103. For example, the TOF circuit 101 may include a TOF emitter circuit including one or more light emitters or illumination sources (e.g. light emitting diodes LEDs or lasers) configured to emit the modulated light transmit signal (e.g. modulated infra-red light). The TOF emitter circuit may be configured to emit the modulated light transmit signal 102 at a controlled modulation frequency which may be greater than 1 MHz, or greater than hundreds of MHz, e.g. between 1 MHz to 500 MHz or e.g. between 1 MHz to about 200 MHz or e.g. between 60 MHz to 100 MHz.

The TOF circuit 101 may further include a TOF sensor pixel circuit including an array (e.g. a two-dimensional 2D array) of sensor pixels configured to receive the modulated light receive signal. Each TOF sensor pixel may include a photonic mixing device (PMD) including transparent charge collectors or photogates for receiving the modulated light receive signal, for example. The PMD sensor pixels may be used for receiving the modulated light receive signal 103 which may include load data information (modulated data) for establishing a wireless transmission channel 106, for example.

The TOF circuit 101 may be part of a TOF camera circuit for generating images. For example, the TOF circuit 101 may be configured to determine depth or distance information between the transceiver device 110 and an object, and/or to generate a three-dimensional (3D) image of the object having depth or distance information based on TOF measurements by the TOF circuit.

The modulated light transmit signal 102 and the modulated light receive signal 103 may be infra-red light signals or visible light signals transmitted or received by the TOF circuit 101. For example, a modulated light transmit signal may be pulse modulated at the controlled modulation frequency (e.g. controlled by the control module 104 or the TOF circuit). Furthermore, the modulated light transmit signals and modulated light receive signals (e.g. 102, 103) transmitted to and from the peripheral device 110 and the access control device 120 may include load data (e.g. may be modulated with loaded data information) to be transmitted to and from the transceiver device 110 and the access control device 120. The modulated light signals to be transmitted or received (e.g. 102, 103) may be phase-shift key (PSK) modulated with the load data information (e.g. with the transmission access request information, or with information for establishing the wireless transmission channel), for example.

The modulated light transmit signal 102 transmitted by the TOF circuit 101 to the access control device 120 may include information related to a transmission access request. The transmission access request may be a (pairing) request by the transceiver device to be paired to or to receive authentication information from the access control device, so that the transceiver device may communicate or connect wirelessly to the communication network via the wireless access point of the access control device. For example, this transmission access request may include a request for the transceiver device to receive network parameters for configuring a wireless connection module of the transceiver device 110 to be able to communicate wireless over a communication network to which the access control device 120 is connected via a wireless transmission channel 106. The modulated light transmit signal 102 carrying the transmission access request may further include identifier information related to the peripheral device, such as an identifier name or number or product type related to the transceiver device 100, for example.

The modulated light receive signal 103 received by the TOF circuit 101 (from the access control device 120) may include information for establishing the wireless transmission channel 106 between the access control device 120 and the transceiver device 110. The information for establishing the wireless transmission channel 106 may include a network identification number, network configuration information, a network login identifier or a network speed, for example. In other words, the modulated light receive signal 103 may include at least one communication parameter (e.g. a network identification number, network configuration information, a network login identifier or a network speed) for a pairing or authentication between the transceiver device 110 and the access control device 120.

The transceiver device 110 may further include a security module configured to encrypt or decrypt the information included in the modulated light transmit signal or the modulated light receive signal. The security module may further be configured for key management such as for the generation and/or storage of cryptographic keys which may be used with the modulated light transmit signal and/or the modulated light receive signal and/or other on-chip signals to improve robustness against error attacks or security attacks.

The control module 104 may include circuitry or computer executable instructions for controlling the transmission of the modulated light transmit signal 102. For example, the control module 104 may include circuitry or computer executable instructions for encoding (e.g. using PSK modulation) the modulated light transmit signal with load data (e.g. with transmission access request information, distance information and/or identifier information). Furthermore, the control module 104 may be configured to control an encryption of load data information carried on the modulated light transmit signal by a security control module before transmitting the light transmit signal, for example.

The control module 104 may include circuitry or computer executable instructions for controlling the receiving of a modulated light receive signal. For example, the control module may include circuitry or computer executable instructions for decoding a modulated light receive signal carrying load data information. Furthermore, the control module 104 may be configured to control a decryption of load data information carried on the modulated light receive signal and received by the TOF circuit 101. For example, the control module 104 may be configured to produce a data signal including the one or more communication parameters based on the modulated light receive signal 103.

The control module 104 may be configured to configure the wireless communication module for the transmission of data via the wireless transmission channel 106, and to establish the transmission channel between the transceiver device 110 and the access control device 120 based on the at least one communication parameter. For example, the control module 104 may include circuitry or computer executable instructions for transmitting the one or more communication parameters to the wireless control module based on the information for establishing the wireless transmission channel. The control module 104 may further be configured to configure the wireless communication module based on or using the one or more communication parameters. Optionally, alternatively or additionally, the control module 104 may be configured to transmit the one or more communication parameters to a display to be displayed to a user of the transceiver device 110, where one or more of the communication parameters for configuring the wireless communication module may be keyed in by the user via an input interface (e.g. a key board, touch screen or voice input interface) of the transceiver device 110.

The transceiver device 110, the control module 104, the time of flight circuit 101, the security module, the wireless communication module and/or other optional modules may be independent hardware units or part of a computer, a digital signal processor or a microcontroller or may be part of a computer program or software product configured to run on a computer, a digital signal processor or a microcontroller, for example. The transceiver device 110, the control module 104, the time of flight circuit 101, the security module, the wireless communication module and/or other optional components may be implemented independently from each other or may be realized at least partly together (e.g. on the same die). For example, the transceiver device 110, the control module 104, the time of flight circuit 101, the security module, the wireless communication module and/or other optional modules may be implemented or formed on a common semiconductor die.

The transceiver device 110 may further be configured to initiate an authentication process based on the one or more communication parameters (e.g. the network identification, login and/or password information). The transceiver device 110 may be configured to submit one or more of the communication parameters as authentication parameters using an authentication protocol via the wireless communication module, for example.

Once the transceiver device 110 is authenticated by the access control device 120, the transceiver device 110 may then be allowed to access the wireless communication network via the wireless transmission channel.

The transceiver device 110 may further include a transmitter and/or receiver circuit used in wireless or mobile communications systems. The transceiver device 110 may be implemented in at least one of a mobile device (e.g. a cell phone or a smart phone), a tablet device (e.g. a touch screen device), a time of flight camera, a personal computer and an all in one computer, for example. In other examples, the transceiver device 110 may be implemented in or may correspond to a smartphone, User Equipment (UE), a laptop, a notebook, a Personal Digital Assistant (PDA), a Universal Serial Bus (USB) stick, a tablet computer, or a car.

The access control device 120 to which the light transmit signal 102 (and/or further light transmit signals) is transmitted, may be a device which includes or provides a wireless access point to a communication network or which provides a communication channel for communicating with a device or network of computers, for example. The communication network may be a local area wireless network based on a communications protocol as defined by the Microwave Access (WIMAX) IEEE 802.16 or Wireless Local Area Network (WLAN) IEEE 802.11, for example. In other examples, the communications protocol may be a bluetooth communication protocol, a 6LoWPAN (IPv6 over Low power Wireless Personal Area Networks) communication protocol or a Zigbee (IEEE 802.15.4) communication protocol. The access control device 120 may be implemented in at least one of a base station, a time of flight camera, a modem, a router, a multimedia station, and a printer, for example.

The transceiver device 110 may include a wireless communication module for establishing the wireless transmission channel between the access control device 120 and the transceiver device 110. The wireless communication module may be a wireless adaptor, for example. The wireless transmission channel 106 may be configured to receive and/or transmit radio frequency wireless signals to and from the local area wireless network. The wireless transmission channel 106 may have a frequency bandwidth (e.g. a radio frequency bandwidth) within the selected frequency bandwidth in accordance with the wireless communication network. The wireless transmission channel 106 may be established between the wireless communication module of the transceiver device 110 and a wireless communication module of the access control device 120 after the one or more communication parameters have been used by the control module 104 for configuring the wireless communication module of the transceiver device 110. Once the wireless transmission channel has been established, data may be transmitted or exchanged between the transceiver device 110 and the access control device 120 via the wireless transmission channel, for example.

The time of flight circuit 101 may be configured to determine distance information related to a distance between the transceiver device 110 and the access control device 120. In some examples, the transceiver device 110 may be configured to transmit distance information related to or about the distance between the access control device 120 and the transceiver device 110 to the access control device 120. The transmission of the distance information may also be carried out via a light transmit signal such as light transmit signal 102 or via a further light transmit signal, by modulating load data in the light transmit signal, for example.

The access control device may transmit the information for establishing the transmission channel based on the distance information related to a distance between the transceiver device 110 and the access control device 120. In other words, the distance information may be used by the access control device 120 to determine whether the access control device 120 transmits information for establishing the wireless communication channel to the transceiver device 110, for example. For example, the access control device 120 may be configured to allow an establishment of a transmission channel between the access control device 120 and the peripheral device 110 based on whether distance between the access control device and a peripheral device 110 exceeds or falls below a threshold distance value.

In some examples, the TOF circuit 101 may be configured to determine the distance information by carrying out a TOF measurement. Each TOF sensor pixel of the TOF sensor pixel circuit may include a photonic mixing device (PMD) including transparent charge collectors or photogates working in alternating bias.

The TOF emitter circuit may be configured to generate a plurality of light pulses, e.g. infra-red or visible light, at the controlled modulation frequency. Reflected light pulses (reflected by the access control device 120) having the modulations frequency may be received by the TOF sensor circuit (e.g. the TOF PMD sensor pixels) which may each measure the phase delay (or phase shift) of the reflected received light signal with respect to a reference modulation signal (e.g. a modulation control signal or the transmitted light signal). The alternatingly biased photogates (which may be biased at the modulations frequency) may alternatingly receive the light pulses modulated at the same frequency The difference in the electrical signal output from the first photogate and the second photogate may be directly dependent on the phase delay between the received light signal and the reference modulation signal and may be represented by a correlation function, for example.

The distance between the access control device 120 and the transceiver device 110 may be determined based on the correlation function representing a phase delay between the received light signal and the reference modulation signal, for example. The receive light signal may be emitted by the TOF emitter circuit of the TOF circuit 101, reflected by the access control device 120 and received by a time of flight pixel sensor circuit, for example.

The transceiver device 110 may be configured to select a communications protocol to be used for the wireless transmission based on the distance information. For example, the control module 104 may be configured to select a first communication protocol of the wireless transmission channel based on a first threshold distance (e.g. based on whether the distance between the access control device and the transceiver device exceeds or falls below the first threshold distance value), and to select a second communication protocol based on second threshold distance (e.g. based on whether the distance between the access control device and the transceiver device exceeds or falls below the second threshold distance value). For example, if a distance between the transceiver device 110 and the access control device 120 is less than 3 m, the control module may be configured to select a first communication protocol (e.g. a Bluetooth, 6loWPAN or Zigbee protocol) of the wireless transmission channel. If a distance between the transceiver device 110 and the access control device 120 is greater than 10 m, the control module may be configured to select a different second communication protocol (e.g. WiFi protocol).

Due to the use of TOF techniques for pairing and authentication, pairing may be performed over several meters. Thus, a host device may be mounted in a safe and secure (not easily manipulated or disturbed) position, several meters (e.g. between 1 m and 50 m, or e.g. between 2 m and 10 m, or e.g. 3 m to 5 m) away from the peripheral device. Due to the TOF technique and its range detection, pairing may be limited to a certain distance or area. In an example, all pairing requests are omitted that originate from peripheral devices that are farther away than 3 meters.

The TOF technique may also include the compensation of daylight and background illumination (e.g. suppression of background illumination). Thus, pairings may be carried out under harsh lighting conditions. As light is used as a data transfer medium, pairing may be performed in harsh industrial environments where RF data transfer (e.g., used by NFC) would be subjected to interference. Furthermore, the risk of a man-in-the-middle attack is minimized as a third party may not only need to be able to intercept the optical channel (which is principally very difficult) but may also need to do the data processing in real time which may be additionally challenging as authentication and image processing are computationally intensive operations.

FIG. 2 shows a schematic illustration of an access control device 220 according to an embodiment.

The access control device 220 includes a time of flight circuit 211 configured to receive a modulated light receive signal 202 from a peripheral device 210. The modulated light receive signal includes information related to a transmission access request.

The access control device 220 further includes a control module 214 configured to control a transmission of a modulated light transmit signal 203 by the time of flight circuit 211. The modulated light transmit signal 203 includes information for establishing a transmission channel between the access control device 220 and the peripheral device 210.

Due to the time of flight (TOF) modulated light receive signal being used for receiving a transmission access request and the TOF modulated light transmit signal being used for transmitting information for establishing a transmission channel, pairing and authentication between the peripheral device and an access control device may be improved. For example, pairing may be carried out over longer distances (in comparison to short range pairing methods). Furthermore, communication network parameters may be easily transmitted by the access control device to the peripheral device 210 and errors associated with the manual pairing of devices may be reduced or avoided, for example.

The access control device 220 (which may include one or more or all the features described with respect to the access control device described in FIG. 1) may be a device which includes or provides a wireless access point to a wireless communication network. For example, the access control device 220 may include a wireless communication module 208 for transmitting or receiving wireless signals through the wireless transmission channel to be established.

The time of flight (TOF) circuit 211 of the access control device 220 may include circuitry or circuit components similar to the TOF circuit 101 of the transceiver device of FIG. 1. For example, the TOF circuit 211 may include a TOF emitter circuit for transmitting a modulated light transmit signal (carrying modulated information for establishing the transmission channel) and a TOF pixel sensor circuit for receiving a modulated light receive signal (carrying modulated information related to a transmission access request).

The TOF circuit 211 of the access control device 220 may also be configured to determine distance information related to a distance between the access control device 220 and the peripheral device 210 and/or other objects, for example. This may be carried out using a TOF procedure or distance measurement as described with respect to FIG. 1, for example.

The peripheral device 210 may include one or more or all of the features already described with respect to the transceiver device of FIG. 1. For example, the peripheral device 210 may include aTOF circuit, a wireless communication module, and a control module.

The modulated light receive signal 202 may be a signal transmitted by the peripheral device 210 and received by the access control device 220, for example. In some examples, the modulated light receive signal 202 may include information related to the transmission access request and identifier information related to the peripheral device, such as an identifier name or number or product type related to the peripheral device. Additionally or optionally, the modulated light receive signal 202 may include distance information related to a distance between the access control device 220 and the peripheral device 210. For example, this may include distance information obtained by a TOF distance measurement carried out by the peripheral device 210, where the distance information is related to a distance between the peripheral device 210 and the access control device 220, for example.

The control module 214 may be configured to allow an establishment of a transmission channel between the access control device 220 and the peripheral device 210 based on whether distance between the access control device and a peripheral device 210 exceeds or falls below a threshold distance value. For example, the control module 214 may be configured to control the TOF circuit 211 so that the TOF circuit 211 transmits the modulated light transmit signal (which may include or carry the communication parameters or information for establishing the transmission channel 106) if the distance information indicates that the distance between the access control device 220 and the peripheral device 210 lies within a predefined distance range. Similarly, the control module 214 may be configured to control the TOF circuit 211 so that the TOF circuit 211 does not transmit the modulated light transmit signal if the distance information indicates that the distance between the access control device 220 and the peripheral device 210 does not fall within the predefined distance range.

A predefined distance range may be a selected by a user or manager of the access control device or may be a predefined distance pre-stored in the access control device, for example. For example, public spaces such as airports may offer access to the wireless communication network to owners of peripheral devices (e.g. mobile communication devices) via the access control device. However, owners or managers of the access control device may desire that access to the wireless communication network may be possible only within a predetermined space or area, e.g. within a cafeteria. Possible predefined distance ranges may depend on the preference of the owner, and also on the acceptable power consumption and/or cost constraints related to the strength of the light sources, for example. Very small (TOF) cameras may provide distance ranges of about 1 m, whereas more powerful cameras may allow up to 50 m range. Possible predefined distance ranges may lie between 1 m and 50 m, or e.g. between 2 m and 10 m, or e.g. 3 m to 5 m, for example, but are not limited to these values.

The control module 214 of the access control device 220 may also be configured to select a first communication protocol for the wireless transmission based on a first threshold distance (e.g. based on whether the distance between the access control device and the transceiver device exceeds or falls below the first threshold distance value), and to select a second communication protocol based on second threshold distance (e.g. based on whether the distance between the access control device and the transceiver device exceeds or falls below the second threshold distance value).

The control module 214 of the access control device 220 may also be configured to control the time of flight circuit 211 to transmit the modulated light transmit signal based on the identifier information related to the peripheral device 210. For example, a peripheral device with the same or duplicate identifier information (e.g. same identity name), or some product types may be prevented from establishing a transmission channel with the access control device.

Once the one or more communication parameters have be transmitted to the peripheral device 210, the peripheral device 210 may log on to use the wireless communication work via the wireless transmission channel by configuring its own wireless communication module based on the one or more communication parameters. The wireless communication module (or the control module 214) of the access control device 210 may further be configured to authenticate the peripheral device 210 to use the wireless communication network based on the configured wireless communication module of the peripheral device 210.

The access control device 220 may further include a security module configured to encrypt or a decrypt the load data information modulated or carried on the modulated light transmit signal or the modulated light receive signal.

The access control device 220, the time of flight circuit 211, the control module 214, the wireless communication module and the security module of the access control device and/or other optional modules may be independent hardware units or part of a computer, a digital signal processor or a microcontroller or may be part of a computer program or software product configured to run on a computer, a digital signal processor or a microcontroller, for example. The access control device 220, the time of flight circuit 211, the control module 214, the wireless communication module and the security module of the access control device and/or other optional components may be implemented independently from each other or may be realized at least partly together (e.g. on the same die). For example, the access control device 220, the time of flight circuit 211, the control module 214, the wireless communication module and the security module of the access control device may be implemented or formed on a common semiconductor die.

More details and aspects are mentioned in connection with the embodiments described above or below (e.g. regarding the transceiver device, the time of flight circuit, the modulated light transmit signal, the modulated light receive signal, the control module, the information related to a transmission access request, the wireless transmission channel, the information for establishing the wireless transmission channel, the wireless control module, and the security module). The embodiment shown in FIG. 2 may comprise one or more optional additional features corresponding to one or more aspects mentioned in connection with the proposed concept or one or more embodiments described above (e.g. FIG. 1) or below (e.g. FIGS. 3 to 8).

Figure 3C:
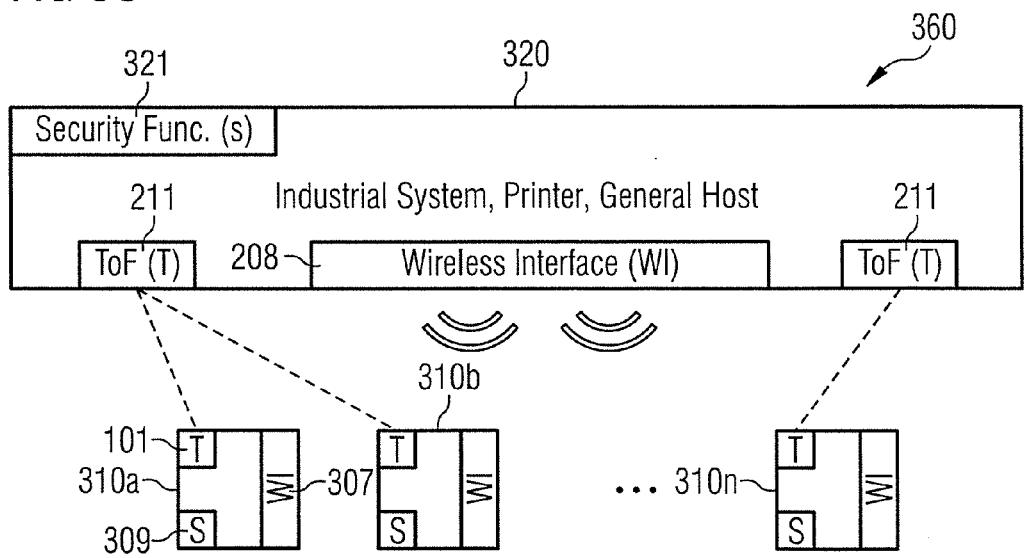

FIGS. 3A to 3C show schematic illustrations of a time of flight-based pairing and/or authentication process between an access control device 320 and a peripheral device 310 according to an embodiment.

FIG. 3A shows a TOF-based pairing and authentication procedure 300. The peripheral device 310 (which may be similar to the peripheral device and/or transceiver device described in FIGS. 1 and 2) may send pairing and authentication requests to the host device via the TOF technique (e.g. by a TOF circuit of the peripheral device 310 emitting a modulated light transmit signal). The host device 320 (which may be similar to the access control device described in FIGS. 1 and 2) may provide a wireless access point to a communication network and may evaluate these requests and the distance (measured by the host device's TOF circuit or the peripheral device's TOF circuit). If an authentication is carried out successfully, the host device 320 may submit the (communication) network parameters to the peripheral device 310, for example. The peripheral device 310 may then apply the received (communication) network parameters to its wireless network configuration (e.g. to the wireless communication module) and may then be able to communicate over the network.

Both the host device 320 and the peripheral device 310 may implement (or be implemented with) a TOF camera system. The TOF based camera systems may be capable of sending and receiving data (to and from other TOF cameras, and to measure the distance between itself and a target object by means of modulation. Depending on the illumination device (e.g. laser or LED) used in the TOF system, data may be exchanged over several meters and in a focused manner, for example.

In an example a TOF-based pairing procedure, a TOF-based pairing procedure may be initiated with an access point (and a peripheral device) over several meters.

The host device 320 (e.g. a WiFi host device) may be equipped with a TOF camera. (The host device 320 may be placed or located on a wall or in a location out of reach from a user 312, for example). The peripheral device 310 may also be equipped with a TOF camera.

The user 312 may aim the TOF camera (e.g. the TOF emitter circuit and the TOF receiver circuit) of the peripheral device 310 towards the host device's TOF camera. The user 312 may trigger a transmission of a pairing request (e.g. carried on the light transmit signal 102) to the host device. For example, after the user presses a "pairing button", the peripheral device 310 may send the pairing request (e.g. the transmission access request) to the host device 320.

In some examples, the peripheral device 310 may be configured to carry out a TOF distance measurement between the peripheral device 310 and the access control device 320 before transmission of the of the transmission access request by transmitting and measuring a reflected modulated light signal. Optionally, the peripheral device 310 may be configured to carry out the TOF distance measurement by measuring the reflected modulated light signal of the light transmit signal carrying the transmission access pairing request information, the reflected modulated light signal being transmitted by the peripheral device 310, reflected by the host device 320 and received by the peripheral device 310.

The host device 320 may answer the pairing request by providing the necessary communication network parameters (e.g. network identification, login and/or password information) to the peripheral device 310 (for establishing the transmission channel). The communication network parameters may be carried or modulated onto a modulated light signal transmitted by the host device 320 to the peripheral device 310.

The peripheral device 310 (after receiving the communication network parameters carried by a modulated light signal) may set the received parameters (in the wireless control module) and log into the WiFi communication network. In some examples, the received parameters may be used for configuring the wireless communication module by manually entering the communication network parameters into an input interface coupled to the wireless communication module. Additionally or alternatively, the communication network parameters received by the TOF circuit may be automatically transmitted (from the control module or a processing module) to the wireless communication module for configuring the wireless communication module. The TOF based communication channel may be used to authenticate the client, (e.g. based on the entered communication network parameters).

Once the peripheral device has been authenticated by the access control device, wireless data transfer may be carried out with the communication network.

In addition to being used for pairing and authentication for establishing the transmission channel, the TOF camera (e.g. the components of the TOF circuits 101 and 201) of the peripheral device and the access control device may also be used for generating TOF images (e.g. 3D depth images or objects) based on modulated transmitted light and reflected modulated light modulated received by the TOF camera. The 3D depth images may be generated based on distance information related to a distance between an object to be photographed and the peripheral device (by TOF measurements), for example. In this way, no additional infra-red emitter or sensor may be needed for pairing and authentication in addition to a TOF camera used for generating images, for example.

FIG. 3B shows a schematic illustration 350 of a host device and peripheral device implementing time of flight systems in order to perform pairing and authentication tasks.

The host device 320 (e.g. the access control device 220) may include a TOF system (e.g. a TOF circuit 211), which may include a TOF light emitter circuit 315 (e.g. one or more LEDs or a laser for emitting infra-red light). The host device 320 may further include a control module 214, which may be coupled to or may be part of the TOF circuit 211. The host device 320 may include the wireless controller module 208, which may be configured to provide a wireless transmission channel 106 (e.g. a wireless hotspot) for wireless communication to a communication network.

The peripheral device 310 (e.g. similar to the transceiver/peripheral device of FIGS. 1 and 2) may include a TOF system (e.g. a TOF circuit 101), which may include a TOF light emitter circuit 305 (e.g. one or more LEDs or a laser for emitting infra-red light). The peripheral device 310 may further include a control module 104, which may be coupled to or may be part of the TOF circuit 101. The peripheral device 310 may include a wireless controller module 307 (e.g. a wireless adaptor), which when configured with communication parameters (network identification, login and/or password information) received from the host device, may be configured to communicate wireless with the communication network via the wireless transmission channel 106 once a TOF-based pairing procedure has been initiated.

In some examples, one of the host device 320 and the peripheral device 310 is implemented with the TOF emitter circuit (e.g. the light sources) and the other one of the host device 320 and the peripheral device 310 is implemented with the TOF sensor circuit. The device implemented with the TOF emitter circuit (e.g. the host device 320) may be configured to transmit a modulated (TOF) light transmit signal in the direction of the device implemented with the TOF sensor circuit (e.g. the peripheral device 310). The device implemented with the TOF emitter circuit may also be configured to transmit information related to the reference modulation signal (e.g. a modulation control signal) to the device implemented with the TOF sensor circuit, e.g. via any other communication channels. The device implemented with the TOF sensor circuit may receive the modulated light transmit signal and determine distance information based on the received modulated light transmit signal and the reference modulation signal, for example.

In an example, only the host device 320 comprises the light sources 315 and only the peripheral device 310 has the sensor 104. Pairing information may be transferred from the host device 320 to the peripheral device 310. The peripheral device 310 may still be able to determine or calculate the distance separation to the host device, as long as the reference signal or reference information is likewise transferred to the peripheral device as well, for example. For example, the reference signal or reference information may be transferred over another channel, e.g. WiFi or by a channel used for the transfer of the pairing information.

FIG. 3C shows a schematic illustration 360 of TOF-based authentication in an industrial system.

One or more (e.g. a plurality of) peripheral devices 310a, 310b . . . 310n may desire to establish a transmission channel between the peripheral device and the host device 320.

A (or each) peripheral device 310 may include a security module (S) 309 configured to carry out security functions (e.g. encryption and/or decryption). For example, the information loaded or carried by the modulated light transmit signal may be encrypted by a security module 309 of the peripheral device, for example. A (or each) peripheral device 310 may further include the wireless communication module 307 and the TOF circuit 101.

The peripheral device 310 may initiate an authentication and/or pairing request by transmitting a modulated light transmit signal including the transmission access request, distance information and/or identifier information to the host device 320.

The host device 320 may include a security module 321 configured to carry out security functions (e.g. encryption and/or decryption), the TOF circuit 211 and the wireless controller module 208, for example.

The host device 320 may be implemented in an industrial device or system, e.g. a printer or a multimedia system for example. The host device 320 may use the TOF interface 211 to establish the wireless or wired interface parameters and a secure channel by authenticating using an integrated security anchor (e.g. provided by the security module 321). For example, the control module of the host device 320 may control the transmission of communication parameters to the peripheral device based on the identifier information and/or the distance information. In an example, the peripheral device may include a printer cartridge and the identifier information may include a printer cartridge identification number. Counterfeit or cloned printer cartridges may be prevented from communicating with the host device 320 via a transmission channel, for example.

The communication parameters to be transmitted to the peripheral device 310 may be encrypted by a security module 321 of the host device 320, and transmitted to the peripheral device 310, for example. When (or once) all (communication) parameters have been established, the wireless or wired interface (e.g. a wired or wireless transmission channel) may be used for further communication (e.g. over the communication network). In some examples, the peripheral device may communicate with the host device via the established transmission channel, e.g. the peripheral device may communicate with a communication network provided by the host device (e.g. a WiFi network) via the established transmission channel.

Authentication, when carried out over a wired or wireless communication interface, may face a risk of a man-in-the-middle attack, where a third party may be placed in between and interfering with the authentication process. The security anchor (e.g. the security module) and the TOF interface (e.g. the TOF circuit) may provide a significant barrier against attacks, cloning and counterfeiting. The TOF techniques may add an additional barrier for an attacker to attack or clone a communication device. Thus, several types of use-cases are covered at the same time.

The various examples described herein relate to using TOF technique for pairing and authenticating electronic devices. Due to TOF techniques, a pairing procedure may be carried out over several meters or may be limited to a certain distance, and may provide robustness against harsh environments. In addition, the pairing process may be done manually, with the Near Field Communication (NFC) technique or other infra-red techniques. However, manual pairing may require the knowledge of network identification numbers, login information, password, and manually entering these values into a mobile device, such as a smart phone, is cumbersome, error prone, and time consuming. The TOF pairing approach may ease this pairing procedure. A subsequent authentication procedure may establish a secured connection between the paired communication partners.

Pairing through NFC may be carried out by bringing together the host device and the peripheral device, and the pairing data may be exchanged through NFC. Due to the NFC technique, the distance between both devices is limited to at most 10 cm. However, in the case of e.g., a WiFi-based wireless communication network, the host device may often be mounted at places that are not easily reachable. These host devices may be mounted on a wall, which may prevent the NFC-based pairing procedure.

Infra-red is capable to pair over a longer distance than NFC, for example. However, this technique lacks the possibility to measure the distance without TOF. Furthermore, infra-red without TOF may further lack the compensation of background illumination (bright daylight). Therefore, a technique (using infra-red without TOF) may be limited in its applicability.

More details and aspects are mentioned in connection with the embodiments described above or below (e.g. regarding the transceiver device, the time of flight circuit, the modulated light transmit signal, the modulated light receive signal, the control module, the information related to a transmission access request, the wireless transmission channel, the information for establishing the wireless transmission channel, the wireless control module, and the security module). The embodiment shown in FIGS. 3A to 3C may comprise one or more optional additional features corresponding to one or more aspects mentioned in connection with the proposed concept or one or more embodiments described above (e.g. FIGS. 1 and 2) or below (e.g. FIGS. 4 to 8).

Figure 4:
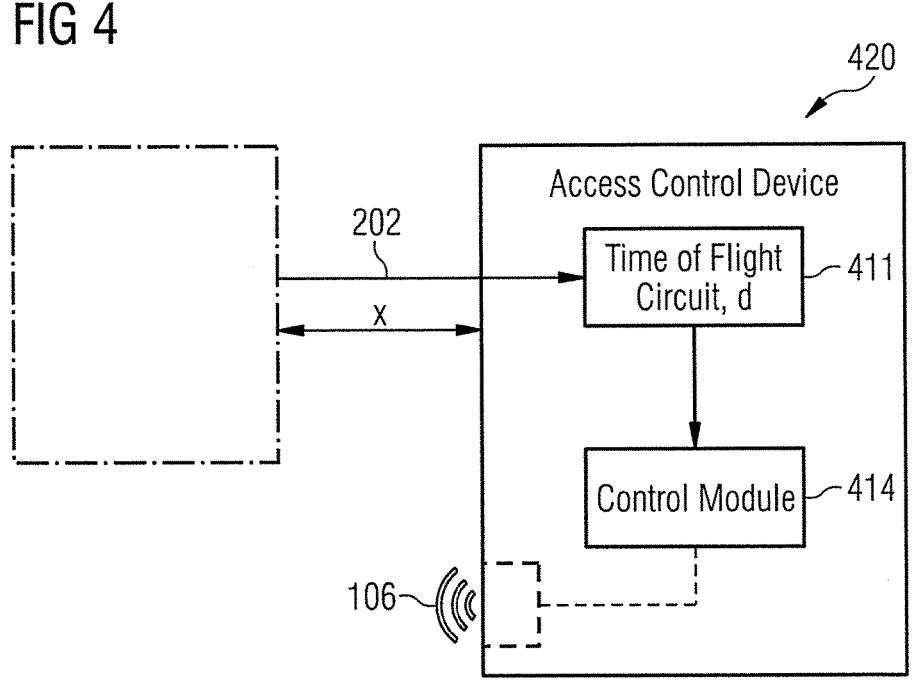
FIG. 4 shows a schematic illustration of an access control device including a time of flight circuit.

FIG. 4 shows a schematic illustration of an access control device 420.

The access control device 420 includes a time of flight circuit 411 configured to determine distance information, d, of a distance, x, between the access control device 420 and a peripheral device 410, or to receive a modulated light receive signal 202 including distance information, d, related to a distance between the access control device 420 and the peripheral device 410.

The access control device 420 includes a control module 414 configured to allow establishment of a transmission channel between the access control device 420 and the peripheral device 410 based on the distance information.

Due to the TOF circuit 411 being configured to receive the distance information based on a TOF signal or to determine the distance information, the allowance or prevention of establishment of a transmission channel may be better controlled, for example.

The distance information, d, may be determined by the TOF circuit 411 based on a TOF measurement, or may be received from the peripheral device 410, for example. The TOF circuit 411 may be configured to receive the modulated light receive signal (including the distance information) from the peripheral device 410. Additionally, alternatively or optionally, the modulated light receive signal may include information related to a transmission access request.

The TOF circuit 411 may be configured to transmit a modulated light transmit signal including information for establishing a transmission channel between the access control device 420 and the peripheral device 410 if the distance information indicates the distance between the access control device and the peripheral device lies within a predefined distance range.

More details and aspects are mentioned in connection with the embodiments described above or below (e.g. regarding the transceiver device, the time of flight circuit, the modulated light transmit signal, the modulated light receive signal, the control module, the information related to a transmission access request, the wireless transmission channel, the information for establishing the wireless transmission channel, the wireless control module, and the security module). The embodiment shown in FIG. 4 may comprise one or more optional additional features corresponding to one or more aspects mentioned in connection with the proposed concept or one or more embodiments described above (e.g. FIGS. 1 to 3) or below (e.g. FIGS. 5 to 8).

FIG. 5 shows a schematic illustration of a transmitter device 500.

The transmitter device 500 includes a control module 524 configured to control a transmission of a modulated light transmit signal by a time of flight emitter circuit 531. The modulated light transmit signal includes load data to be transmitted.

Due to the use of the TOF emitter circuit for transmitting a modulated light transmit signal including load data, load data may be transmitted over longer distances compared to other near field communication technologies. Furthermore, the load data may be transmitted even under harsh lighting conditions, as background illumination may be suppressed using a TOF Suppression of Background Illumination (SBI) process.

The transmitter device 500 may be implemented in a transceiver/peripheral device and/or in an access control device as described in FIGS. 1 to 4. The transmitter device 500 may be part of a transceiver or may be coupled to a receiver device, for example.

The load data may be digitally encoded in the modulated light transmit signal, e.g. using modulation techniques, such as phase shift key (PSK) modulation, for example. The load data may include information related to a transmission access request and/or information for establishing a transmission channel, for example.

More details and aspects are mentioned in connection with the embodiments described above or below (e.g. regarding the transceiver device, the time of flight circuit, the modulated light transmit signal, the modulated light receive signal, the control module, the information related to a transmission access request, the wireless transmission channel, the information for establishing the wireless transmission channel, the wireless control module, and the security module). The embodiment shown in FIG. 5 may comprise one or more optional additional features corresponding to one or more aspects mentioned in connection with the proposed concept or one or more embodiments described above (e.g. FIGS. 1 to 4) or below (e.g. FIGS. 6 to 8).

FIG. 6 shows a schematic illustration of a receiver device 600.

The receiver device 600 includes a time of flight module 641 configured to receive a modulated light receive signal including load data, such as a modulated light receive signal 603. The receiver device 600 includes a processing module 625 configured to generate a data signal, ds, including the load data based on the modulated light receive signal.

Due to the use of the TOF module 641 for receiving a modulated light receive signal including load data, load data may be received over longer distances compared to other near field communication technologies. Furthermore, load data may be received even under harsh lighting conditions, as background illumination may be suppressed using a TOF Suppression of Background Illumination (SBI) process.

The receiver device 600 may be implemented in a transceiver or coupled to a transmitter device (e.g. 500), which may be implemented in a transceiver/peripheral device and/or in an access control device as described in FIGS. 1 to 4.

The load data received in the modulated light receive signal may be digitally encoded in the modulated light transmit signal, e.g. using modulation techniques, such as phase shift key (PSK) modulation. The load data may include information related to a transmission access request and/or information for establishing a transmission channel, for example.

The processing module 625 may include a decoder circuit or module (e.g. a PSK decoder) configured to decode the load data in the modulated receive signal. The data signal which may include the load data information may include the one or more communication parameters for configuring a wireless communication module coupled to the receiver device, for example.

The processing module 625 may further be configured to determine distance information of a distance between the receiver device and an access control device based on the modulated light receive signal and a reference modulation light receive signal received by the receiver device 600.

The reference modulation light receive signal 603 may be received from an external light source, such as an external light source 610. In some examples, the external light source may be transmitted by a light source or a TOF emitter circuit controlled by the access control device. In some examples, the external light source may be a light source arranged in proximity to the access control device. In some examples, the external light source may be arranged so that a light signal (e.g. the reference modulation light receive signal) may be transmitted by the external light source and received by the receiver device 600 via a (direct or unblocked) transmission path. In some examples, the external light source may optionally or additionally be arranged so that the light signal may be transmitted by the external light source to the access control device via a (direct or unblocked) transmission path and further transmitted to the receiver device via a (direct or unblocked) transmission path.

More details and aspects are mentioned in connection with the embodiments described above or below (e.g. regarding the transceiver device, the time of flight circuit, the modulated light transmit signal, the modulated light receive signal, the control module, the information related to a transmission access request, the wireless transmission channel, the information for establishing the wireless transmission channel, the wireless control module, and the security module). The embodiment shown in FIG. 6 may comprise one or more optional additional features corresponding to one or more aspects mentioned in connection with the proposed concept or one or more embodiments described above (e.g. FIGS. 1 to 5) or below (e.g. FIGS. 7 to 8).

FIG. 7 shows a flow chart of a method 700 for establishing a wireless transmission channel.

The method 700 includes controlling 710 a transmission of a modulated light transmit signal including information related to a transmission access request by a time of flight circuit to an access control device.

The method 700 includes emitting 720 the modulated light transmit signal by the time of flight circuit.

The method 700 includes receiving 730 by the time of flight circuit a modulated light receive signal comprising information for establishing the wireless transmission channel from the access control device.

The method 700 includes controlling 740 an establishment of a wireless transmission channel based on the modulated light receive signal.

Due to the time of flight (TOF) modulated light transmit signal being used for a transmission access request and the TOF modulated light receive signal being used for establishing a wireless transmission channel, pairing and authentication for establishing a wireless transmission channel may be improved. For example, access requests and pairing may be carried out over longer distances (in comparison to short range pairing methods such as near field communication NFC pairing). Furthermore, errors associated with the manual pairing of devices may be reduced or avoided, for example.

More details and aspects are mentioned in connection with the embodiments described above or below (e.g. regarding the transceiver device, the time of flight circuit, the modulated light transmit signal, the modulated light receive signal, the control module, the information related to a transmission access request, the wireless transmission channel, the information for establishing the wireless transmission channel, the wireless control module, and the security module). The embodiment shown in FIG. 7 may comprise one or more optional additional features corresponding to one or more aspects mentioned in connection with the proposed concept or one or more embodiments described above (e.g. FIGS. 1 to 6) or below (e.g. FIG. 8).

FIG. 8 shows a flow chart of a method 800 for establishing a transmission channel.

The method 800 includes receiving 810, by a time of flight circuit of a peripheral device, a modulated light receive signal comprising information related to a transmission access request by a time of flight circuit.

The method 800 further includes controlling 820, by a control module, a transmission of a modulated light transmit signal by the time of flight circuit, wherein the modulated light transmit signal includes information for establishing a transmission channel between an access control device and the peripheral device.

Due to receiving the time of flight (TOF) modulated light receive signal carrying a transmission access request and the TOF modulated light transmit signal for carrying information for establishing a wireless transmission channel, pairing and authentication for establishing a wireless transmission channel may be improved. For example, access requests and pairing may be carried out over longer distances (in comparison to short range pairing methods such as near field communication NFC pairing). Furthermore, errors associated with the manual pairing of devices may be reduced or avoided, for example.

More details and aspects are mentioned in connection with the embodiments described above or below (e.g. regarding the transceiver device, the time of flight circuit, the modulated light transmit signal, the modulated light receive signal, the control module, the information related to a transmission access request, the wireless transmission channel, the information for establishing the wireless transmission channel, the wireless control module, and the security module). The embodiment shown in FIG. 8 may comprise one or more optional additional features corresponding to one or more aspects mentioned in connection with the proposed concept or one or more embodiments described above (e.g. FIGS. 1 to 7) or below.

In some examples, a method for establishing a transmission channel includes determining, by a time of flight circuit, distance information of a distance between an access control device and a peripheral device, or receiving a modulated light receive signal including distance information related to a distance between the access control device and the peripheral device. The method further includes allowing, by a control module, establishment of a transmission channel between the access control device and the peripheral device based on the distance information.

In some examples, a method for transmitting a signal includes modulating a modulated light transmit signal with load data to be transmitted, and controlling, by a control module, a transmission of the modulated light transmit signal by a time of flight emitter circuit.

In some examples, a method for receiving a signal comprises receiving a modulated light receive signal including load data and generating a data signal including the load data based on the modulated light receive signal.

More details and aspects are mentioned in connection with the embodiments described above or below (e.g. regarding the transceiver device, the time of flight circuit, the modulated light transmit signal, the modulated light receive signal, the control module, the information related to a transmission access request, the wireless transmission channel, the information for establishing the wireless transmission channel, the wireless control module, and the security module). The examples may comprise one or more optional additional features corresponding to one or more aspects mentioned in connection with the proposed concept or one or more embodiments described above (e.g. FIGS. 1 to 8) or below.

Various embodiments relate to a time of flight (TOF) based system that performs pairing and authentication for information security.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The invention claimed is:

1. A transceiver device, comprising:
a time of flight circuit configured to emit a modulated light transmit signal and to receive a modulated light receive signal;
a controller configured to control a transmission of a modulated light transmit signal by the time of flight circuit to an access control device, wherein the modulated light transmit signal comprises information related to a transmission access request,
wherein the controller is further configured to control an establishment of a wireless transmission channel based on a modulated light receive signal received by the time of flight circuit from the access control device, wherein the modulated light receive signal comprises information for establishing the wireless transmission channel, wherein the time of flight circuit is configured to demodulate the modulated light receive signal comprising the information based on a photon mixing of the modulated light receive signal and an external reference signal received by the time of flight circuit; and
wherein the controller is further configured to perform an authentication procedure with the access control device using signaling via the modulated light transmit signal and the modulated light receive signal before establishing the wireless transmission channel, and establish the wireless transmission channel on a condition that the authentication procedure is carried out successfully via the modulated light transmit signal and the modulated light receive signal.

2. The transceiver device according to claim 1, wherein the modulated light receive signal comprises at least one communication parameter for a pairing or authentication between the transceiver device and the access control device, wherein the controller is configured to establish the transmission channel between the transceiver device and the access control device based on the at least one communication parameter.

3. The transceiver device according to claim 2, further comprising a wireless adapter, wherein the controller is configured to configure the wireless adapter for the transmission of data via the wireless transmission channel, based on the information for establishing the wireless transmission channel.

4. The transceiver device according to claim 1, wherein the information for establishing the wireless transmission channel comprises at least one of a network identification number, network configuration information, a network login identifier and a network speed.

5. The transceiver device according to claim 1, further comprising a security processor configured to encrypt or decrypt the information comprised in the modulated light transmit signal or the modulated light receive signal.

6. The transceiver device according to claim 1, wherein the time of flight circuit is configured to determine distance information related to a distance between the transceiver device and the access control device, and to transmit the distance information to the access control device.

7. The transceiver device according to claim 6, wherein the transceiver device is configured to select a communications protocol to be used for the wireless transmission based on the distance information.

8. An access control device comprising:
a time of flight circuit configured to receive a modulated light receive signal from a peripheral device and transmit a modulated light transmit signal to the peripheral device, wherein the modulated light receive signal comprises information related to a transmission access request; and
a controller configured to control a transmission of a modulated light transmit signal by the time of flight circuit, wherein the modulated light transmit signal comprises information for establishing a wireless transmission channel between the access control device and the peripheral device, wherein the time of flight circuit is configured to demodulate the modulated light receive signal comprising the information based on a photon mixing of the modulated light receive signal and an external reference signal received by the time of flight circuit,
wherein the controller is further configured to perform an authentication procedure with the peripheral device using signaling via the modulated light transmit signal and the modulated light receive signal before establishing the wireless transmission channel, and establish the wireless transmission channel on a condition that the authentication procedure is carried out successfully via the modulated light transmit signal and the modulated light receive signal.

9. The access control device according to claim 8, wherein the time of flight circuit is configured to determine distance information related to a distance between the access control device and the peripheral device.

10. The access control device according to claim 8, wherein the modulated light receive signal comprises distance information related to a distance between the access control device and the peripheral device.

11. The access control device according to claim 10, wherein the controller is configured to control the time of flight circuit to transmit the modulated light transmit signal if the distance information indicates that the distance between the access control device and the peripheral device lies within a predefined distance range.

12. The access control device according to claim 8, wherein the modulated light receive signal comprises identifier information related to the peripheral device, and wherein the controller is configured to control the time of flight circuit to transmit the modulated light transmit signal based on the identifier information related to the peripheral device.

13. The access control device according to claim 8, wherein the access control device comprises a wireless adapter for transmitting or receiving wireless signals through a wireless transmission channel to be established.

14. The access control device according to claim 8, wherein the access control device comprises a security processor configured to encrypt or a decrypt the information comprised in the modulated light transmit signal or the modulated light receive signal.

15. The access control device according to claim 8, wherein the access control device is implemented in at least one of a base station, a time of flight camera, a modem, a router, a multimedia station, and a printer.

16. A receiver device, comprising:
a time of flight circuit configured to receive a modulated light receive signal comprising load data from an access control device, the modulated light receive signal including information for establishing a radio frequency communication channel; and
a processor configured to generate a data signal based on the modulated light receive signal and establish the radio frequency communication channel to the access control device based on the information received via the modulated light receive signal,
wherein the processor is further configured to perform an authentication procedure with the access control device using signaling via a modulated light transmit signal and the modulated light receive signal before establishing the radio frequency communication channel, and establish the radio frequency communication channel on a condition that the authentication procedure is carried out successfully via the modulated light transmit signal and the modulated light receive signal,
wherein the processor is configured to determine distance information of a distance between the receiver device and the access control device based on the modulated light receive signal and a reference modulation light receive signal received by the receiver device.

17. The receiver device according to claim 16, wherein the reference modulation light receive signal is received from an external light source.

* * * * *